United States Patent
Kim et al.

(10) Patent No.: US 10,752,261 B2
(45) Date of Patent: Aug. 25, 2020

(54) DRIVER DISTRACTION WARNING CONTROL APPARATUS AND METHOD

(71) Applicants: HYUNDAI MOTOR COMPANY, Seoul (KR); KIA MOTORS CORPORATION, Seoul (KR)

(72) Inventors: Sam Yong Kim, Hwaseong-si (KR); Jin Kwon Kim, Suwon-si (KR); Byoung Joon Lee, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/447,140

(22) Filed: Jun. 20, 2019

(65) Prior Publication Data
US 2020/0148220 A1    May 14, 2020

(30) Foreign Application Priority Data

Nov. 14, 2018  (KR) .......................... 10-2018-0140194

(51) Int. Cl.

| | |
|---|---|
| *B60W 50/14* | (2020.01) |
| *G06K 9/00* | (2006.01) |
| *B60W 40/04* | (2006.01) |
| *B60W 50/08* | (2020.01) |
| *B60W 40/09* | (2012.01) |

(52) U.S. Cl.
CPC ............ *B60W 50/14* (2013.01); *B60W 40/04* (2013.01); *B60W 40/09* (2013.01); *B60W 50/085* (2013.01); *G06K 9/00845* (2013.01)

(58) Field of Classification Search
CPC .... B60W 50/14; B60W 40/04; B60W 50/085; B60W 40/09; G06K 9/00845
USPC ........................................................ 340/349
See application file for complete search history.

(56) References Cited

U.S. PATENT DOCUMENTS

| | | | |
|---|---|---|---|
| 2017/0267169 A1* | 9/2017 | Fleurence ................ | B60Q 3/85 |
| 2019/0143993 A1* | 5/2019 | Aoi ........................ | B60W 40/09 |
| | | | 340/439 |
| 2019/0144003 A1* | 5/2019 | Hyuga .................. | B60W 50/14 |
| | | | 340/425.5 |

FOREIGN PATENT DOCUMENTS

| | | |
|---|---|---|
| JP | 2006-318049 A | 11/2006 |
| JP | 2008-137467 A | 6/2008 |
| JP | 2009-248599 A | 10/2009 |

* cited by examiner

*Primary Examiner* — Joseph H Feild
*Assistant Examiner* — Sharmin Akhter
(74) *Attorney, Agent, or Firm* — McDonnell Boehnen Hulbert & Berghoff LLP (57) ABSTRACT

The present disclosure relates to a driver distraction warning control apparatus and a driver distraction warning control method. The driver distraction warning control apparatus includes a sensor device that detects gaze of a driver, a setting device configured to divide a virtual area on front of the driver into a plurality of gaze areas, and sets a threshold for each of the gaze areas, a determining device that determines a viewing area corresponding to the driver's gaze direction from among the gaze areas, and a controller that performs driver distraction warning control based on the threshold set for the determined viewing area.

20 Claims, 12 Drawing Sheets

| SYSTEM STATE | WARNING THRESHOLD FOR EACH AREA |
|---|---|
| LONGITUDINAL CONTROL OFF | B1, B2, B3, B4 : TH1 |
| LATERAL CONTROL OFF | |
| LONGITUDINAL CONTROL ON | B1, B2 : TH2(<->TH1) |
| LATERAL CONTROL OFF | B3, B4 : TH1 |
| LONGITUDINAL CONTROL OFF | B1, B2 : TH1 |
| LATERAL CONTROL ON | B3, B4 : TH2(<->TH1) |
| LONGITUDINAL CONTROL ON | B1, B2, B3, B4 : TH3 |
| LATERAL CONTROL ON | (<->TH2<->H1) |

DRIVER DISTRACTION WARNING CONTROL APPARATUS AND METHOD

CROSS REFERENCE TO RELATED APPLICATION

This application is claims the benefit of priority to Korean Patent Application No. 10-2018-0140194, filed in the Korean Intellectual Property Office on Nov. 14, 2018, the entire contents of which are incorporated herein by reference.

TECHNICAL FIELD

The present disclosure relates to a driver distraction warning control apparatus and a driver distraction warning control method.

BACKGROUND

A driver warning system recognizes face, gaze direction, a time with eyes closed, etc. of a driver by using a camera while driving the vehicle, and combines them to warn the driver of the warning state.

In addition, an autonomous driving system is a system that automatically performs longitudinal control and/or lateral control of the vehicle without requiring operation of a driver. In the case of operating such an autonomous driving system, a driver is sometimes more careless than in the case of manual driving.

An existing driver warning system does not take into account the activation state of the autonomous driving system or the like in the case of performing driver distraction warning. That is, even when the autonomous driving system is activated, warning control may be performed according to the same criteria as manual driving, thus resulting in false warning.

SUMMARY

The present disclosure has been made to solve the above-mentioned problems occurring in the prior art while advantages achieved by the prior art are maintained intact.

An aspect of the present disclosure provides a driver distraction warning control apparatus and a driver distraction warning control method, which improve a driver's satisfaction with driving by differently setting thresholds for gaze areas for a driver according to a state of an autonomous driving system to reduce false warning and/or immoderate warning.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a driver distraction warning control apparatus includes a sensor device that detects gaze of the driver, a setting device that divides a virtual area on front of the driver into a plurality of gaze areas, and sets a threshold for each of the gaze areas, a determining device that determines a viewing area corresponding to gaze direction of the driver from among the gaze areas, and a controller that performs driver distraction warning control based on the threshold set for the determined viewing area.

The plurality of gaze areas may include a front area corresponding to frontal gaze of the driver and distraction areas around the front area, and the distraction areas may include a first area on upper side of the front area, a second area on lower side of the front area, a third area on left side of the front area, and a fourth area on right side of the front area.

The setting device may set the thresholds of the first to fourth areas based on an operational state of a vehicle driving control system.

The setting device may set thresholds of the first to fourth areas to a minimum threshold when a longitudinal control system and a lateral control system are both inactivated.

The setting device may adjust the thresholds of the first and second areas upward when the longitudinal control system is activated.

The setting device may variably set the thresholds of the first and second areas based on a distance between a host vehicle and a preceding vehicle.

The setting device may adjust the thresholds of the third and fourth areas upward when the lateral control system is activated.

The setting device may variably set the thresholds of the third and fourth areas based on a distance between a host vehicle and a left lane or a right lane.

The setting device may set the thresholds of the first to fourth areas to a maximum threshold when a longitudinal control system and a lateral control system are both activated.

The setting device may variably set the thresholds of the first to fourth areas based on a distance between a host vehicle and a preceding vehicle and a distance between the host vehicle and a left lane or a right lane.

The threshold may be a permitted gaze holding time for each of the gaze areas.

The controller, when any one of the first to fourth areas is determined as a viewing area, may compare gaze holding time of the driver for the viewing area with a threshold and output a warning signal.

The controller, when the front area is determined as a viewing area, may release driver distraction warning.

The sensor device may further detect behavior of the driver during driving.

The setting device may determine a degree of distraction based on the gaze direction, the gaze holding time, and the behavior of the driver and adjust the thresholds downward depending on the degree of distraction.

According to another aspect of the present disclosure, a driver distraction warning control method includes dividing a virtual area on front of a driver into a plurality of gaze areas and setting a threshold for each of the gaze areas, detecting gaze of a driver, determining a viewing area corresponding to gaze direction of the driver from among the gaze areas, and performing driver distraction warning control based on the threshold set for the determined viewing area.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
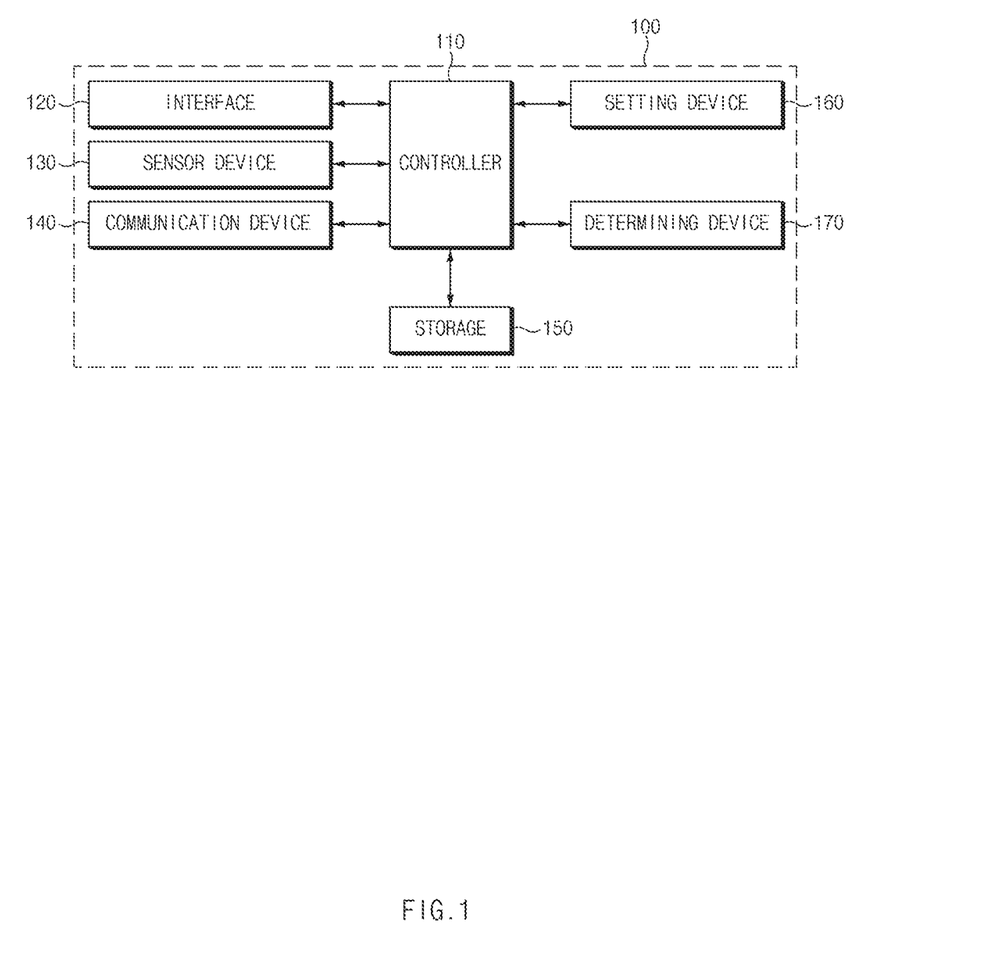
FIG. 1 is a diagram illustrating a configuration of a driver distraction warning control apparatus according to an embodiment of the present disclosure.

FIG. 1 illustrates a configuration of a driver distraction warning control apparatus according to an embodiment of the present disclosure.

Referring to FIG. 1, a driver distraction warning control apparatus 100 may include a controller 110, an interface 120, a sensor device 130, a communication device 140, storage 150, a setting device 160, and a determining device 170. In the disclosure, the controller 110, the determining device 170, and the setting device 160 of the driver distraction warning control apparatus 100 according to the present embodiment may be implemented as at least one processor.

The interface 120 may include, for example, an input device that receives a control command from a driver and an output device that outputs an operational state, results, or the like of the driver distraction warning control apparatus 100.

In this case, the input device may include a key button, and may also include a mouse, a joystick, a jog shuttle, a stylus pen, and the like. In addition, the input device may also include a soft key implemented on a display.

The output device may include a display and may also include an audio output device, such as a speaker. In this case, when a touch sensor such as a touch film, a touch sheet, or a touch pad is provided in the display, the display may operate as a touch screen, and may be implemented as an integrated form of the input device and the output device.

The display may include at least one of a liquid crystal display (LCD), a thin film transistor liquid crystal display (TFT LCD), an organic light-emitting diode (OLED), a flexible display, a field emission display (FED), and a three-dimensional display (3D display).

As an example, the display may display a warning message according to a distraction state of the driver. In addition, the audio output device may output warning sound according to a distraction state of the driver.

The sensor device 130 may include at least one sensor which detects gaze and/or behavior of a driver. As an example, the sensor device 130 may include a camera that captures an image of a driver. The sensor device 130 may further include a sensor that detects a change in movement of the driver. An embodiment for arrangement of the sensor device 130 is referred to in FIG. 2.

Figure 2:
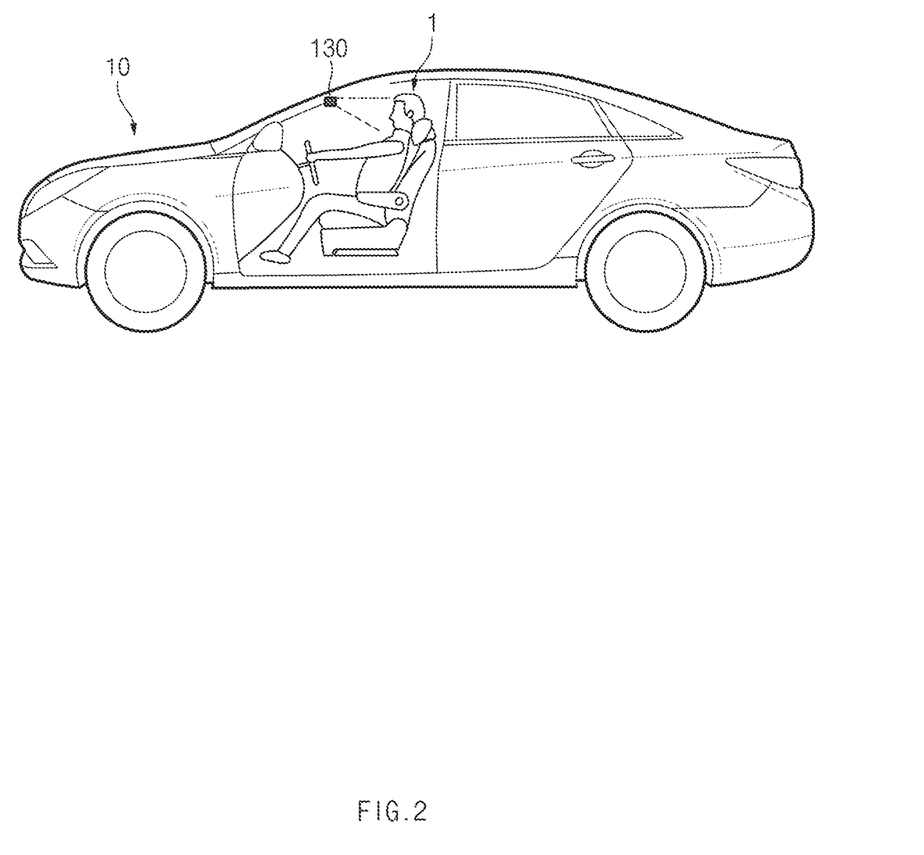
FIGS. 2, 3, 4, 5A, 5B, 5C, 5D, and 5E are diagrams illustrating an embodiment referred to describe operation of a driver distraction warning control apparatus according to an embodiment of the present disclosure.

As illustrated in FIG. 2, the sensor device 130 may be arranged inside a vehicle 10. In this case, the sensor device 130 may be arranged such that a detection direction is directed to the front of a driver 1.

On the other hand, the sensor device 130 may further include a sensor that detects a distance between a host vehicle and a preceding vehicle or a distance between the host vehicle and a right/left lane.

The communication device 140 may include a communication module that supports communication interfaces with electrical components and/or control units provided in the vehicle. As one example, the communication module may be communicatively connected to a driving control system of the vehicle or a unit that manages the driving control system to receive information on the operational state of the driving control system. In the disclosure, the driving control system may include a longitudinal control system such as an inter-vehicle distance maintenance system (e.g., Smart Cruise Control (SCC)) and a lateral control system such as a lane maintenance assist system (e.g., Lane Keeping Assistance (LKA)).

In the disclosure, the communication module may include a module supporting vehicle network communication such as CAN (Controller Area Network) communication, LIN (Local Interconnect Network) communication, and Flex-Ray communication.

In addition, the communication module may include a module for wireless Internet connection or a module for short range communication. In the disclosure, wireless Internet technology may include wireless LAN (WLAN), wireless broadband (WIBRO), Wi-Fi, World Interoperability for Microwave Access (WIMAX), and the like, and short range communication technology may include Bluetooth, ZigBee, Ultra Wideband (UWB), Radio Frequency Identification (RFID), Infrared Data Association (IrDA), and the like.

The storage 150 may store data and/or algorithms necessary for driver distraction warning control apparatus 100 to operate.

As an example, the storage 150 may store information on a virtual area on the front of the driver and a plurality of gaze areas. The storage 150 may store threshold setting information.

In addition, the storage 150 may store instructions and/or an algorithm for setting a threshold according to an operational state of the driving control system and/or a degree of distraction. In addition, the storage 150 may store instructions and/or an algorithm for performing distraction warning control according to a driver's viewing area.

In the disclosure, the storage 150 may include storage medium, such as a random access memory (RAM), a static random access memory (SRAM), a read only memory (ROM), a programmable read-only memory (PROM), an electrically erasable programmable read-only memory (EEPROM) and the like.

The setting device 160 may divide a virtual area on the front of the driver into a plurality of gaze areas, and set a threshold for each of the gaze areas. In the disclosure, the threshold may be a permitted gaze holding time for each of the gaze areas.

The plurality of gaze areas may include a front area corresponding to the frontal gaze of the driver and distraction areas around the front area. In addition, the distraction areas may include a first area on the upper side of the front area, a second area on the lower side of the front area, a third area on the left side of the front area, and a fourth area on the right side of the front area. The embodiment of FIG. 3 is referred to as an embodiment for the plurality of gaze areas.

As one example, the front area may be a gaze area in which the gaze of the driver is directed to a driving lane ahead and/or the left/right lane. The first area may be a gaze area in which the driver' gaze is directed to the mirror of a sun visor. The second area may be a gaze area in which the driver' gaze is directed to a cluster screen, a button on a steering wheel, and/or the driver's cellular phone. The third area may be a gaze area in which the gaze of the driver is directed to a left side mirror and/or a window in the direction of the driver's seat. The fourth area may be a gaze area in which the driver' gaze is directed to a room mirror, a button on the instrument panel, the side mirror of a front passenger's seat, and/or a window in the direction of an assistant seat.

Figure 3:
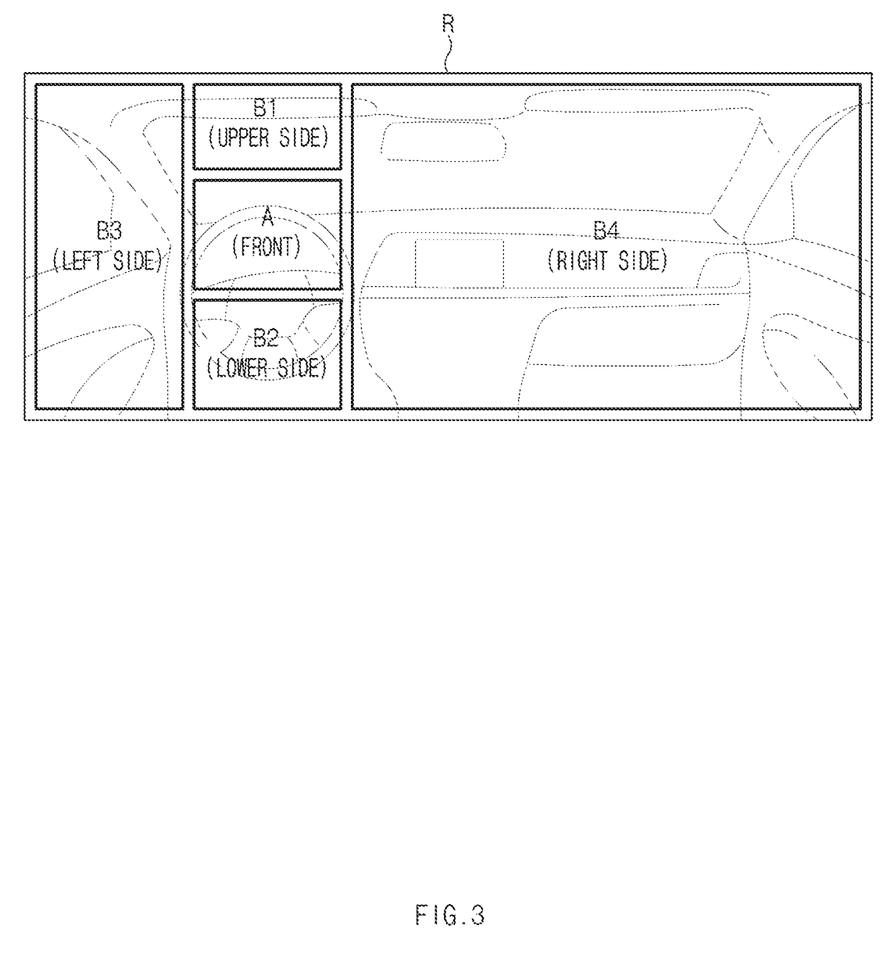

Referring to FIG. 3, a virtual area R may be divided into a plurality of gaze areas. An "A" area of the plurality of gaze areas may be an area corresponding to the direction of the frontal gaze of the driver and may correspond to a front area.

Since the front area corresponds to the attention area of the driver, a threshold for distraction warning may not be set. On the other hand, the setting device 160 may set a threshold for the front area to infinity or a maximum threshold.

Areas B1 to B4 correspond to the dispersed gaze directions of the driver, B1 may correspond to the first area, B2 to the second area, B3 to the third area, and B4 to the fourth area. Of course, a position and a size of each gaze area, the number of areas resulting from division, and the like according to the embodiment of FIG. 3 are not limited thereto, but may be changeable according to embodiments.

The setting device 160 may set the thresholds of the first to fourth areas according to the operational state of the driving control system of the vehicle. The embodiment of FIG. 4 may be referred to with respect to the thresholds of the first to fourth areas according to the operational state of the driving control system of the vehicle.

Figure 4:
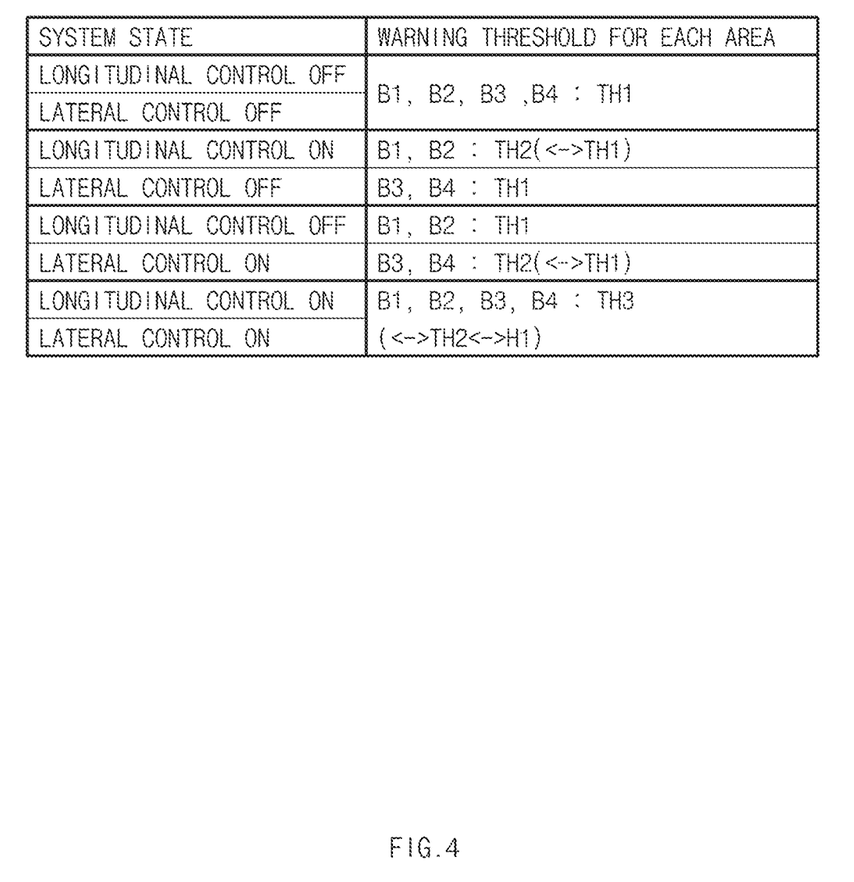

When both the longitudinal control system and the lateral control system are in the inactivated state, it is necessary to sensitively cope with the gaze direction of the driver.

Accordingly, when it is determined that both the longitudinal control system and the lateral control system are in the inactivated state, the setting device 160 may set all the thresholds of the first area and the second area that are distraction areas in the longitudinal direction, and the third area and the fourth area that are distraction areas in the lateral direction to the minimum threshold TH1.

Figure 5A:
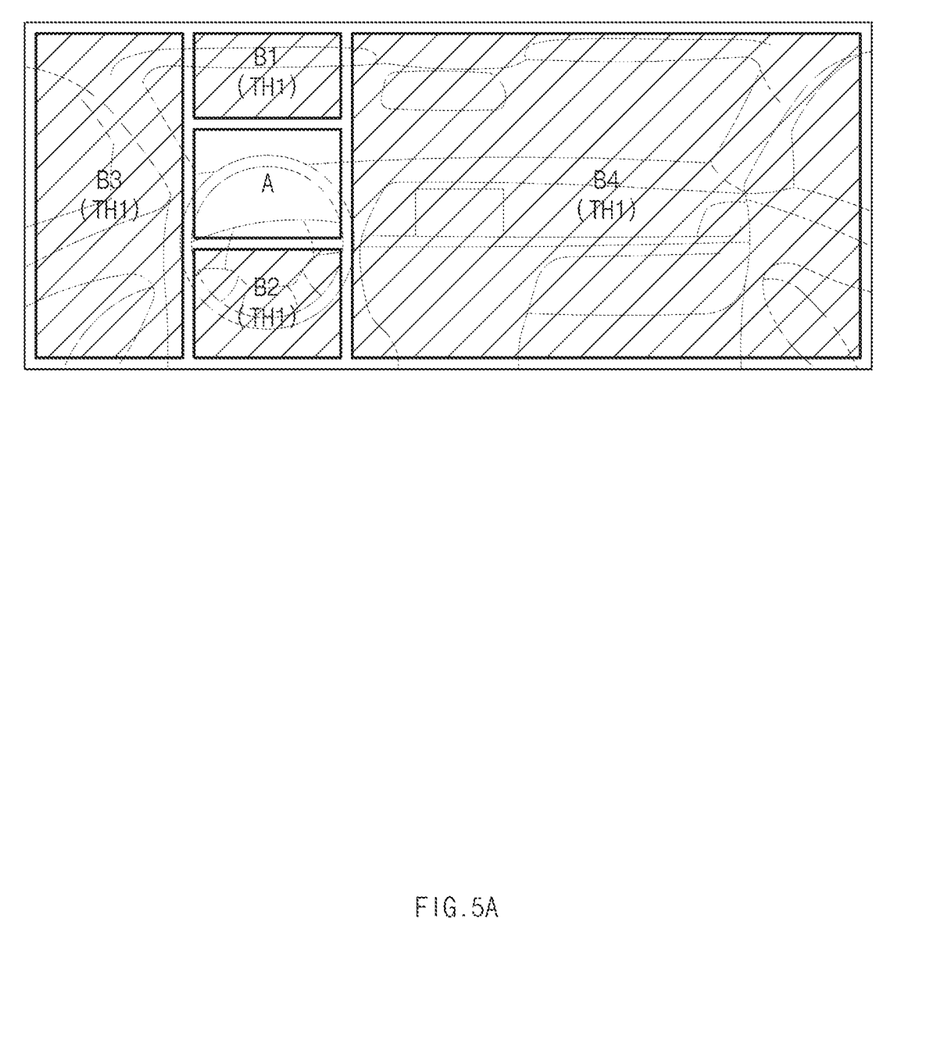

The embodiment in which the thresholds of the first to fourth areas are all set to the minimum threshold TH1 is referred to in FIG. 5A.

On the other hand, when the lateral control system is in the inactivated state and the longitudinal control system is in an activated state, it is necessary to cope with the gaze in the lateral direction more sensitively than the gaze in the longitudinal direction.

Accordingly, when the longitudinal control system is activated, the setting device 160 may maintain the minimum threshold TH1 for the third area and the fourth area, which are the distraction areas in the lateral direction, and adjust the thresholds of the first area and the second area which are the distraction areas in the longitudinal direction up to TH2 from TH1 (TH2>TH1).

Figure 5B:
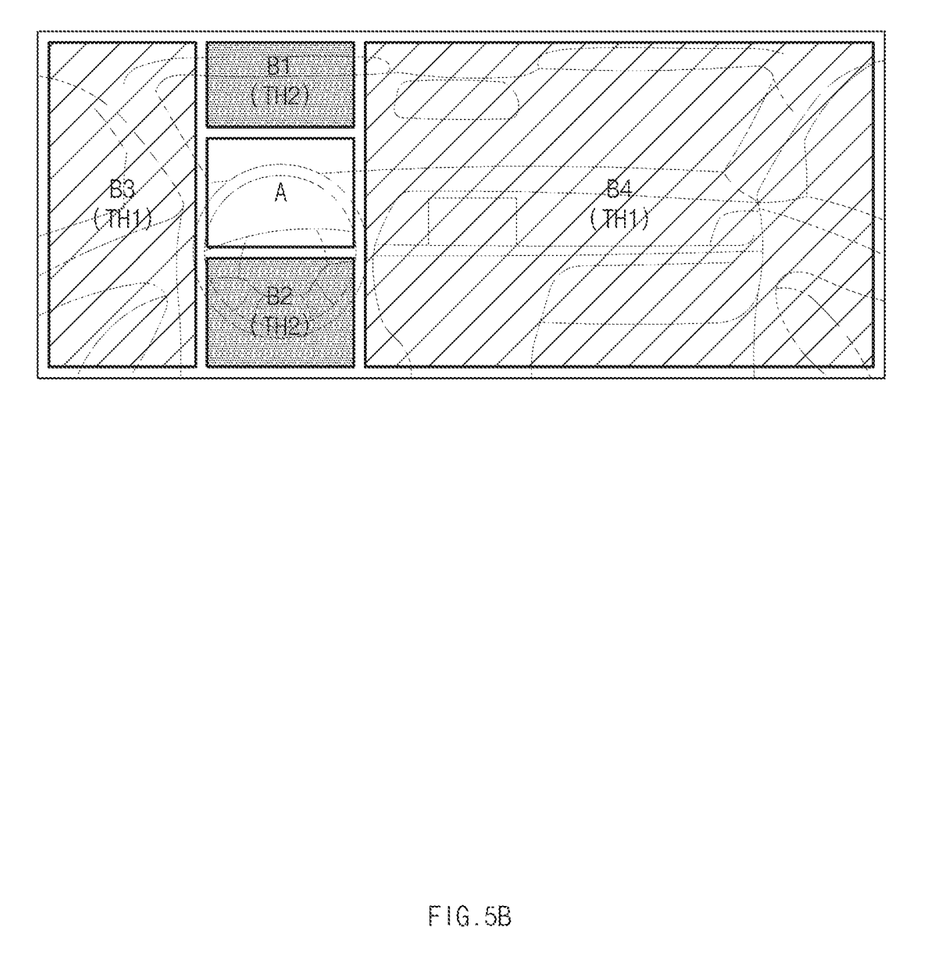

The embodiment in which the thresholds of the first area and the second area are adjusted up to TH2 as the longitudinal control system is activated is referred to in FIG. 5B.

In this case, the setting device 160 may variably set the thresholds of the first area and the second area based on the distance between the host vehicle and the preceding vehicle. As an example, when the distance between the host vehicle and the preceding vehicle is less than a reference distance, it is necessary to sensitively cope with the gaze in the longitudinal direction. Therefore, when the distance between the host vehicle and the preceding vehicle is less than the reference distance, the setting device 160 may again set the thresholds of the first area and the second area to TH1 from TH2.

On the other hand, when the longitudinal control system is in the inactivated state and the lateral control system is in the activated state, it is necessary to cope with the gaze in the longitudinal direction more sensitively than the gaze in the lateral direction.

Therefore, when the lateral control system is activated, the setting device 160 may maintain the minimum thresholds TH1 for the first area and the second area that are the distraction areas in the longitudinal direction and adjust the thresholds of the third area and the fourth area that are the distraction areas in the lateral direction up to TH2 (TH2>TH1).

Figure 5C:
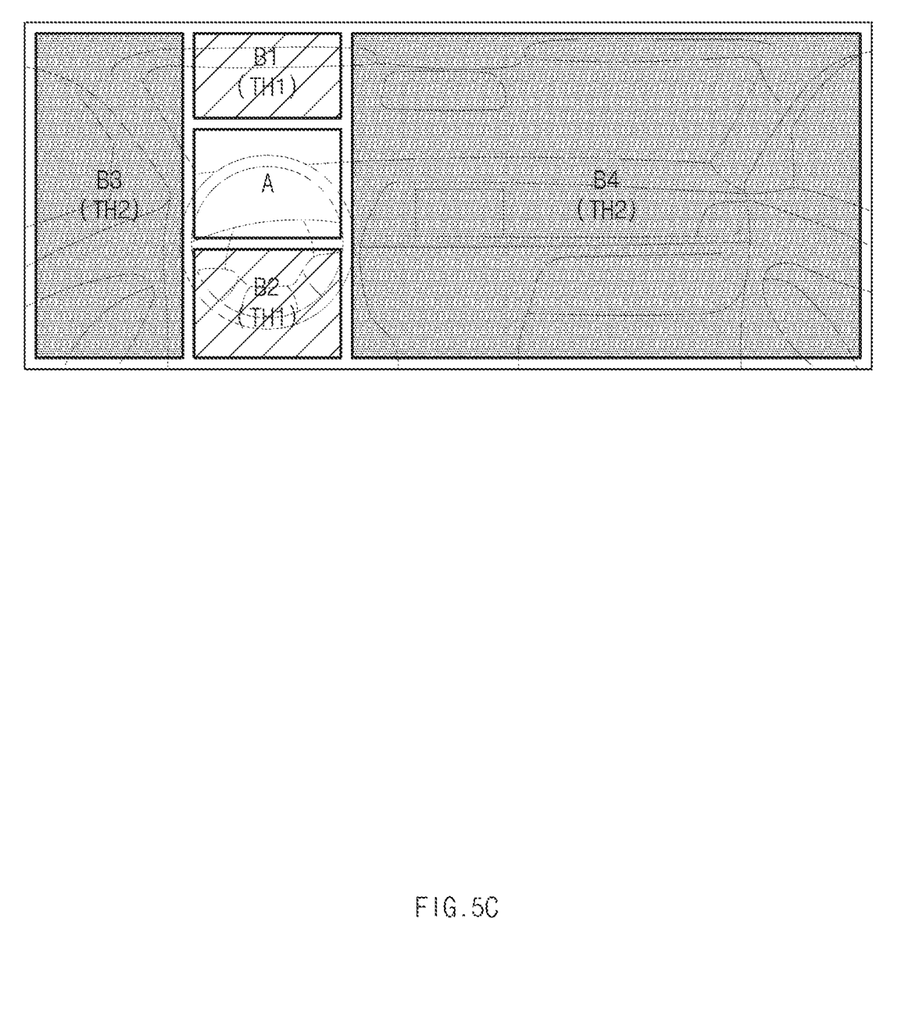

The embodiment in which the thresholds of the third area and the fourth area are adjusted up to TH2 as the lateral control system is activated is referred to in FIG. 5C.

In this case, the setting device 160 may variably set the thresholds of the third area and the fourth area based on the distance between the host vehicle and the left lane or the right lane. As an example, when the distance between the host vehicle and the left lane or the right lane is less than the reference distance, it is necessary to sensitively cope with the gaze in the lateral direction. Therefore, when the distance between the host vehicle and the left lane is less than the reference distance, the setting device 160 may again set the thresholds of the third area and the fourth area to TH1 from TH2.

In a case where both the longitudinal control system and the lateral control system are in the activated state, it is necessary to less sensitively cope with the gaze direction of the driver.

Accordingly, when both the longitudinal control system and the lateral control system are in the activated state, the setting device 160 may set all the thresholds of the first area and the second area that are distraction areas in the longitudinal direction, and the third area and the fourth area that are distraction areas in the lateral direction to TH2 or the maximum threshold TH3.

Figure 5D:
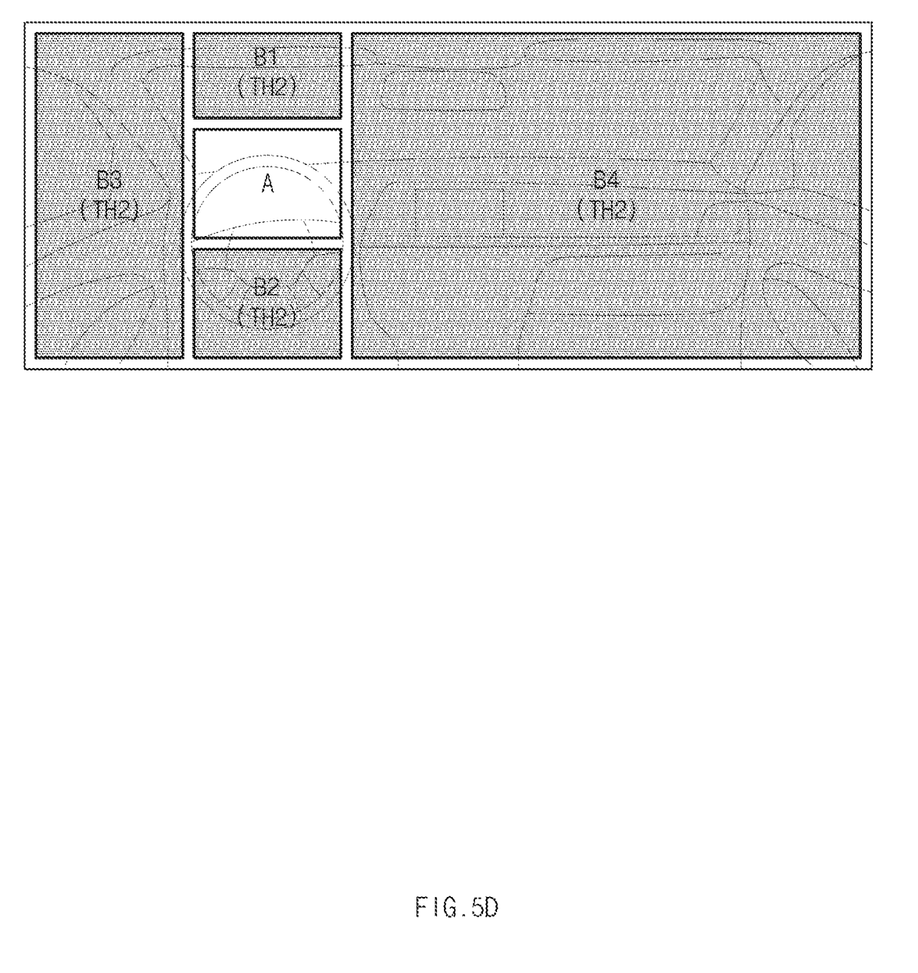
Figure 5E:
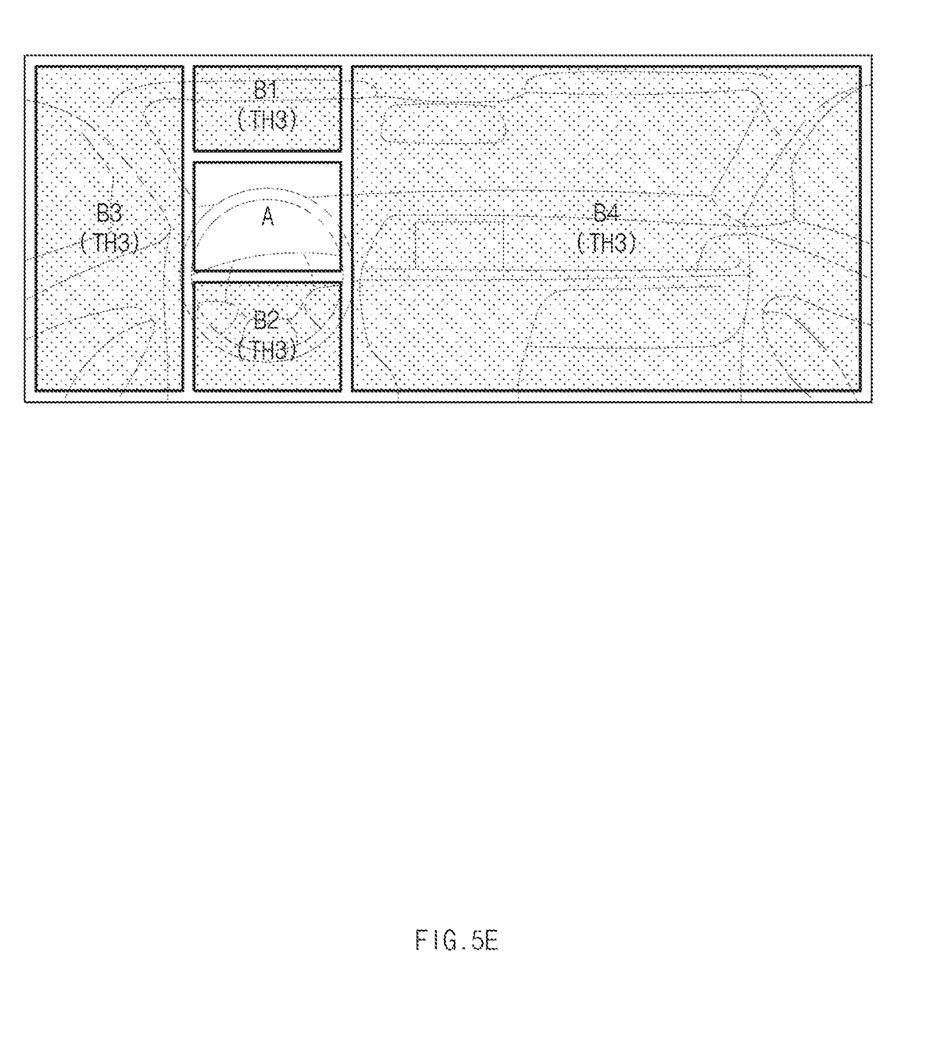

The embodiment in which the thresholds of the first to fourth areas are all set to TH2 or the maximum threshold TH3 is referred to in FIG. 5D and FIG. 5E.

In this case, the setting device 160 may variably set the thresholds of the first to fourth areas based on the distance between the host vehicle and the preceding vehicle, and the distance between the host vehicle and the left lane or the right lane.

In addition, the setting device 160 may determine a degree of distraction based on the gaze direction, the gaze holding time, and the behavior of the driver and adjust the threshold downward according to the degree of distraction. In this case, the setting device 160 may adjust a threshold set for each gaze area downward. In addition, the setting device 160 may adjust the maximum threshold and/or the minimum threshold downward.

The determining device 170 may identify the gaze direction detected by the sensor device 130, and determine a viewing area corresponding to the gaze direction of the driver from among the gaze areas into which the virtual area on the front of the driver is divided.

The controller 110 may perform driver distraction warning control based on a threshold set for the viewing area determined by the determining device 170.

As an example, when the threshold of the gaze area is set as in FIG. 5A, the determining device 170 may determine to which of the first area to fourth area the gaze direction of the driver is directed. In this case, when it is identified that the gaze direction of the driver is directed to the first area, the determining device 170 may determine the first area as the viewing area.

The controller 110 may perform driver distraction warning control based on TH1 set for the first area determined as the viewing area. In this case, the controller 110 may compare the gaze holding time of the driver for the viewing area with a threshold and output a warning signal. As an example, when the gaze holding time of the driver for the viewing area exceeds the threshold TH1, the controller 110 may output a warning signal.

As another example, when the threshold of the gaze area is set as in FIG. 5B, the determining device 170 may determine to which of the first area to fourth area the gaze direction of the driver is directed. In this case, when it is identified that the gaze direction of the driver is directed to the second area, the determining device 170 may determine the second area as the viewing area.

The controller 110 may perform driver distraction warning control based on TH2 set for the second area determined as the viewing area. When the gaze holding time of the driver for the viewing area exceeds the threshold TH2, the controller 110 may output a warning signal.

On the other hand, when the front area is determined as the viewing area, the controller 110 may release driver distraction warning.

As described above, the driver distraction warning control apparatus 100 according to the present embodiment may be implemented in the form of an independent hardware device including memory and a processor that processes each operation, and may be operated in the form of being included in another hardware device such as a microprocessor or a general purpose computer system.

The driver distraction warning control apparatus 100 according to the present disclosure may be implemented inside the vehicle. As an example, the driver distraction warning control apparatus 100 according to the present disclosure may be implemented in the form of an in-vehicle driver warning system.

The operational flowchart of the above-described driver distraction warning control apparatus according to the present disclosure will be described in more detail below.

Figure 6:
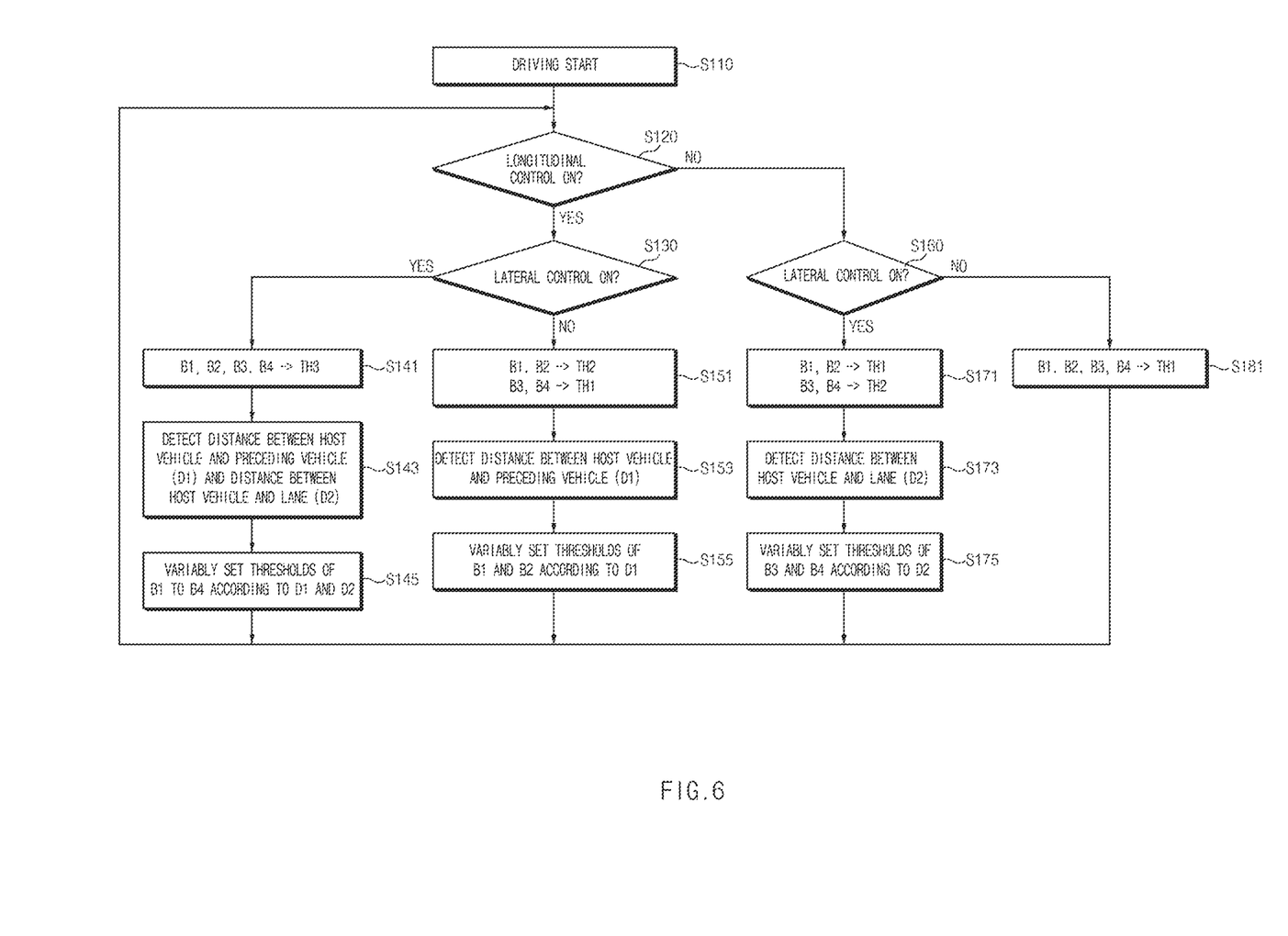
FIGS. 6 and 7 are diagrams of an operational flowchart of a driver distraction warning control method according to an embodiment of the present disclosure.
Figure 7:
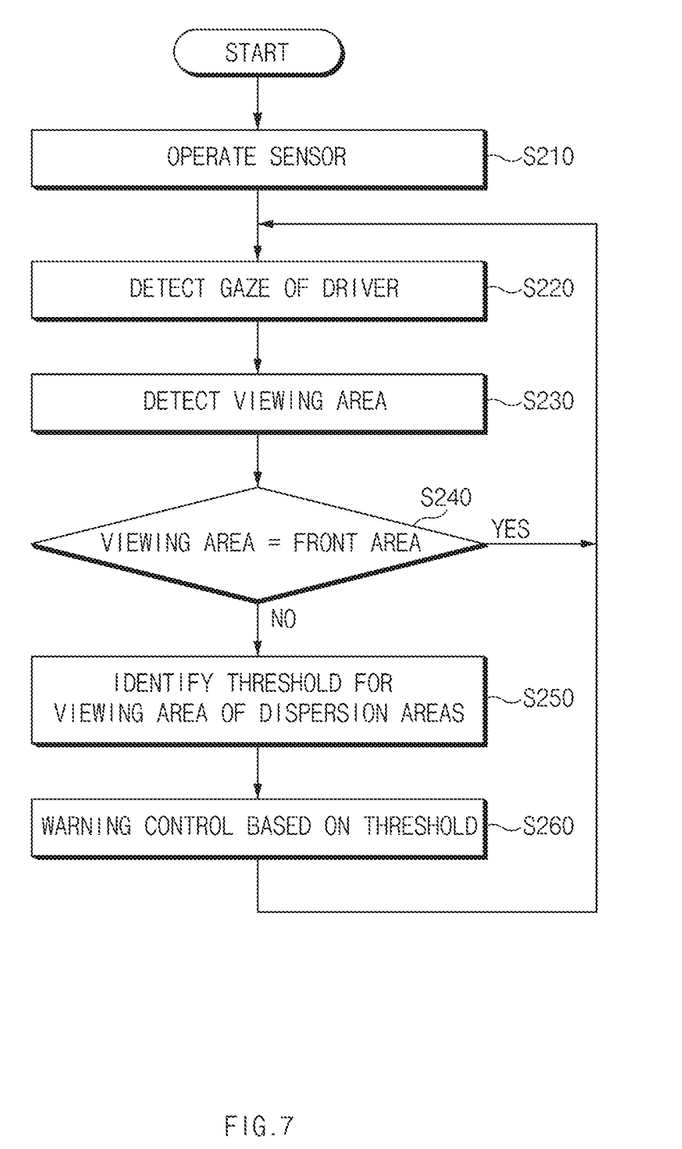

FIGS. 6 and 7 are diagrams of an operational flowchart of a driver distraction warning control method according to an embodiment of the present disclosure.

First, FIG. 6 is an operational flowchart for setting a threshold for a gaze area. As illustrated in FIG. 6, when driving of a vehicle is started (S110), the driver distraction warning control apparatus 100 may determine whether longitudinal control, lateral control, or longitudinal/lateral integrated control is performed.

When it is determined that the longitudinal control and the lateral control both are performed in steps S120 and S130, the driver distraction warning control apparatus 100 may set the thresholds of the first to fourth areas B1, B2, B3, and B4 to the maximum threshold TH3 (S141). Subsequently, the driver distraction warning control apparatus 100 may detect a distance D1 between a host vehicle and a preceding vehicle and a distance D2 to a host vehicle and a lane (S143), and variably set the thresholds of B1 to B4 according to the detected distances D1 and D2 (S145).

On the other hand, when it is determined that the longitudinal control is only performed in steps S120 and S130, the driver distraction warning control apparatus 100 may set the thresholds of the first area and the second area B1 and B2 in the longitudinal direction to TH2 that is higher than the minimum threshold and the thresholds of the third area and the fourth area B3 and B4 in the lateral direction to the minimum threshold TH1 (S151). Subsequently, the driver distraction warning control apparatus 100 may detect the distance D1 between the host vehicle and the preceding vehicle (S153) and variably set the thresholds of B1 and B2 according to the detected distance D1 (S155).

On the other hand, when it is determined that the lateral control is only performed in steps S120 and S160, the driver distraction warning control apparatus 100 may set the thresholds of the first area and the second area B1 and B2 in the longitudinal direction to the minimum threshold TH1 and the thresholds of the third area and the fourth area B3 and B4 in the lateral direction to TH2 that is higher than the minimum threshold (S171). Thereafter, the driver distraction warning control apparatus 100 may detect a distance D2 between the host vehicle and a lane (S173) and variably set the thresholds of B3 and B4 according to the detected distance D2 (S175).

When it is determined that both the longitudinal control and the lateral control are not performed in steps S120 and S160, the driver distraction warning control apparatus 100 may set the thresholds of the first to fourth areas B1, B2, B3 and B4 to the minimum threshold TH1 (S181).

FIG. 7 is an operational flowchart for performing driver distraction warning control according to the present disclosure.

As illustrated in FIG. 7, the driver distraction warning control apparatus 100 may operate a sensor during driving (S210) and detect a gaze of a driver (S220).

The driver distraction warning control apparatus 100 may detect a gaze area detected in step S220, to which the gaze direction of the driver is directed, from among the plurality of gaze areas on the front of the driver, as a viewing area (S230).

The driver distraction warning control apparatus 100 may determine whether the viewing area detected in step S230 is the front area corresponding to the attention area. When it is determined that the viewing area is the front area (S240), the driver distraction warning control apparatus 100 may release driver distraction warning and again perform the steps subsequent to step S220.

When it is determined that the viewing area is not the front area in step S240, the driver distraction warning control apparatus 100 may identify a threshold for an area corresponding to the viewing area among the distraction areas, that is, the first to fourth areas (S250).

In this case, the driver distraction warning control apparatus 100 may perform distraction warning control based on the threshold identified in step S250 (S260). In step S260, when the gaze holding time of the driver for the viewing area exceeds the threshold, the driver distraction warning control apparatus 100 may output a warning signal.

Thereafter, the driver distraction warning control apparatus 100 may repeatedly perform steps S220 to S270 until the driving of the host vehicle is terminated.

Figure 8:
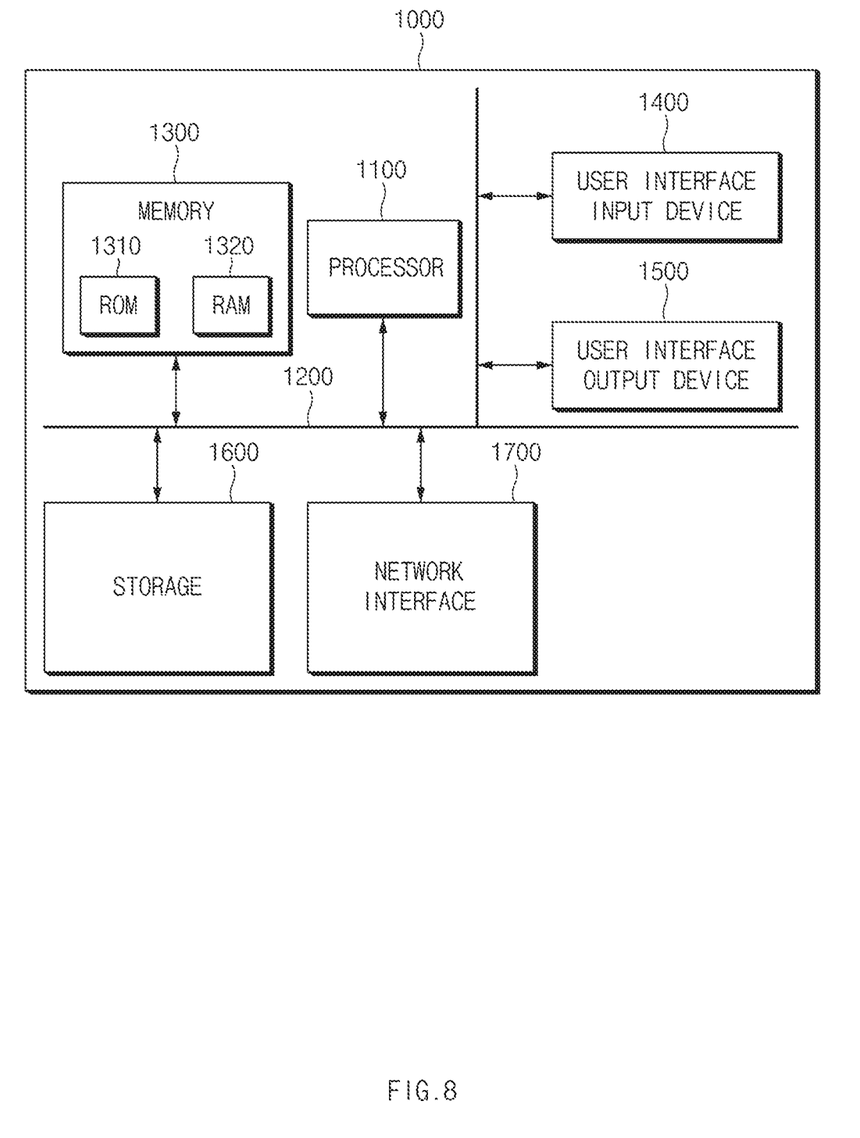
FIG. 8 illustrates a computing system in which a method according to an embodiment of the present disclosure is executed.

FIG. 8 illustrates a computing system in which a method according to an embodiment of the present disclosure is executed.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, it is possible to improve a driver's satisfaction with driving by differently setting thresholds for gaze areas for a diver according to a state of an autonomous driving system to reduce false warning and/or immoderate warning with respect to the driver's distraction.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A driver distraction warning control apparatus comprising:
    a sensor device configured to detect gaze of a driver;
    a setting device configured to divide a virtual area on front of the driver into a plurality of gaze areas, and set a threshold for each of the gaze areas;
    a determining device configured to determine a viewing area corresponding to gaze direction of the driver from among the gaze areas; and
    a controller configured to perform driver distraction warning control based on the threshold set for the determined viewing area;
    wherein the plurality of gaze areas includes a front area corresponding to a frontal gaze of the driver and distraction areas around the front area;
    wherein the distraction areas include a first area on upper side of the front area, a second area on lower side of the front area, a third area on left side of the front area, and a fourth area on right side of the front area; and
    wherein the setting device sets thresholds of the first to fourth areas to a minimum threshold when a longitudinal control system and a lateral control system are both inactivated.

2. The driver distraction warning control apparatus of claim 1, wherein the setting device sets the thresholds of the first to fourth areas based on an operational state of a vehicle driving control system.

3. The driver distraction warning control apparatus of claim 1, wherein the setting device adjusts the thresholds of the first and second areas upward when the longitudinal control system is activated.

4. The driver distraction warning control apparatus of claim 3, wherein the setting device variably sets the thresholds of the first and second areas based on a distance between a host vehicle and a preceding vehicle.

5. The driver distraction warning control apparatus of claim 1, wherein the setting device adjusts the thresholds of the third and fourth areas upward when the lateral control system is activated.

6. The driver distraction warning control apparatus of claim 5, wherein the setting device variably sets the thresholds of the third and fourth areas based on a distance between a host vehicle and a left lane or a right lane.

7. The driver distraction warning control apparatus of claim 2, wherein the setting device sets the thresholds of the first to fourth areas to a maximum threshold when a longitudinal control system and a lateral control system are both activated.

8. The driver distraction warning control apparatus of claim 7, wherein the setting device variably sets the thresholds of the first to fourth areas based on a distance between a host vehicle and a preceding vehicle and a distance between the host vehicle and a left lane or a right lane.

9. The driver distraction warning control apparatus of claim 1, wherein the controller, when any one of the first to fourth areas is determined as a viewing area, compares gaze holding time of the driver for the viewing area with a threshold and outputs a warning signal.

10. The driver distraction warning control apparatus of claim 1, wherein the controller, when the front area is determined as a viewing area, releases driver distraction warning.

11. The driver distraction warning control apparatus of claim 1, wherein the sensor device further detects behavior during driving of the driver.

12. The driver distraction warning control apparatus of claim 11, wherein the setting device determines a degree of distraction based on the gaze direction of the driver, gaze holding time of the driver, and behavior of the driver and adjusts the thresholds downward depending on the degree of distraction.

13. The driver distraction warning control apparatus of claim 1, wherein the threshold is a permitted gaze holding time for each of the gaze areas.

14. A driver distraction warning control method comprising:
dividing a virtual area on front of a driver into a plurality of gaze areas and setting a threshold for each of the gaze areas;
detecting gaze of a driver;
determining a viewing area corresponding to gaze direction of the driver from among the gaze areas; and
performing driver distraction warning control based on the threshold set for the determined viewing area;
wherein the plurality of gaze areas includes a front area corresponding to frontal gaze of the driver and distraction areas around the front area;
wherein the distraction areas include a first area on upper side of the front area, a second area on lower side of the front area, a third area on left side of the front area, and a fourth area on right side of the front area; and
wherein the setting of the threshold includes setting thresholds of the first to fourth areas to a minimum threshold when a longitudinal control system and a lateral control system are both inactivated.

15. The driver distraction warning control method of claim 14, wherein the setting of the threshold includes:
adjusting the thresholds of the first and second areas upward when the longitudinal control system is activated, and
variably setting the thresholds of the first and second areas based on a distance between a host vehicle and a preceding vehicle.

16. The driver distraction warning control method of claim 14, wherein the setting of the threshold includes
adjusting the thresholds of the third and fourth areas upward when the lateral control system is activated; and
variably setting the thresholds of the third and fourth areas based on a distance between a host vehicle and a left lane or a right lane.

17. The driver distraction warning control method of claim 14, wherein the setting of the threshold further includes
setting thresholds of the first to fourth areas to a maximum threshold when a longitudinal control system and a lateral control system are both activated; and
variably setting the thresholds of the first to fourth areas based on a distance between a host vehicle and a left lane or a right lane.

18. The driver distraction warning control method of claim 14, wherein the performing of the driver distraction warning control includes, when any one of the first to fourth areas is determined as a viewing area, comparing gaze holding time of the driver for the viewing area with a threshold and outputting a warning signal.

19. The driver distraction warning control method of claim 14, wherein the performing of the driver distraction warning control includes, when the front area is determined as a viewing area, releasing driver distraction warning.

20. The driver distraction warning control method of claim 14, further comprising:
detecting behavior of the driver during driving; and
determining a degree of distraction based on gaze direction, gaze holding time, and behavior of the driver and adjusting the thresholds downward depending on the degree of distraction.

* * * * *